United States Patent
Zensai (10) Patent No.: US 7,990,489 B2
(45) Date of Patent: Aug. 2, 2011

(54) LIQUID CRYSTAL DISPLAY DEVICE HAVING FRAME AND LIGHT DIFFUSING PLATE

(75) Inventor: Atsunori Zensai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 429 days.

(21) Appl. No.: 12/140,400

(22) Filed: Jun. 17, 2008

(65) Prior Publication Data

US 2008/0316393 A1   Dec. 25, 2008

(30) Foreign Application Priority Data

Jun. 21, 2007   (JP) .................................. 2007-163267

(51) Int. Cl.
*G02F 1/1335*   (2006.01)
*G02F 1/1333*   (2006.01)

(52) U.S. Cl. .................... 349/61; 349/64; 349/58

(58) Field of Classification Search .............. 349/61, 349/64, 58
See application file for complete search history.

(56) References Cited

U.S. PATENT DOCUMENTS

| | | | | |
|---|---|---|---|---|
| 6,835,961 | B2 * | 12/2004 | Fukayama | 257/84 |
| 2005/0110920 | A1 * | 5/2005 | Harayama et al. | 349/61 |
| 2007/0110386 | A1 | 5/2007 | Chiang | |

FOREIGN PATENT DOCUMENTS

| | | | |
|---|---|---|---|
| JP | 11-84351 A | | 3/1999 |
| JP | 11084351 A | * | 3/1999 |
| JP | 2001-91947 A | | 4/2001 |
| JP | 2001091947 A | * | 4/2001 |
| JP | 2003-43484 A | | 2/2003 |
| JP | 2003-344854 A | | 12/2003 |
| JP | 2007-10818 A | | 1/2007 |
| WO | WO 2006/134735 A1 | | 12/2006 |
| WO | WO 2007/037250 A1 | | 4/2007 |

OTHER PUBLICATIONS

Japanese Office Action of corresponding JP Application No. 2007-163267 dated May 10, 2011.

* cited by examiner

*Primary Examiner* — Mike Qi
(74) *Attorney, Agent, or Firm* — Global IP Counselors (57) ABSTRACT

A liquid crystal display device includes a frame, a linear light source, a liquid crystal cell, a light diffusing plate and a positioning mechanism. The light diffusing plate is disposed between the frame and the liquid crystal cell and has an optical processing region formed in a first direction from a first side portion of the light diffusing plate to a second side portion of the light diffusing plate. The positioning mechanism positions the light diffusing plate with respect to the frame with a middle portion of at least one of the first and second side portions of the light diffusing plate in a second direction perpendicular to the first direction being used as a reference to align the optical processing region of the light diffusing plate with the linear light source in the second direction.

8 Claims, 5 Drawing Sheets

FIG. 7

LIQUID CRYSTAL DISPLAY DEVICE HAVING FRAME AND LIGHT DIFFUSING PLATE

CROSS-REFERENCE TO RELATED APPLICATIONS

This application claims priority to Japanese Patent Application No. 2007-163267 filed on Jun. 21, 2007. The entire disclosure of Japanese Patent Application No. 2007-163267 is hereby incorporated herein by reference.

BACKGROUND OF THE INVENTION

1. Field of the Invention

The present invention generally relates to a liquid crystal display device. More specifically, the present invention relates to a liquid crystal display device having an optical sheet with an optical processing region.

2. Background Information

A conventional liquid crystal display device includes a rear frame, a linear light source, a pair of lamp frames, a liquid crystal cell, a plurality of optical sheets and a bezel. The rear frame is made of sheet metal. The linear light source includes a plurality of slender fluorescent tubes. The lamp frames covers and hides both longitudinal ends of the linear light source. The lamp frames are attached to the rear frame. The liquid crystal cell is attached to the rear frame. The optical sheets are interposed between the rear frame and the liquid crystal cell. The optical sheets include a light diffusing plate. The liquid crystal cell and the optical sheets are fixed to the rear frame by the bezel.

With the liquid crystal display device, the light diffusing plate diffuses light emitted from the linear light source. The light diffusing plate serves to make the brightness more uniform on a display face of the liquid crystal cell. Optical processing regions in the form of a plurality of bands extend from one end to the other end of the light diffusing plate. The optical processing regions are formed by printed regions on just one side of the light diffusing plate. The light diffusion ratio in the optical processing regions is varied in a width direction of the optical processing regions.

With the conventional liquid crystal display device, processing for forming the printed regions on one side of the light diffusing plate (hereinafter referred to as "print processing") involves designating one side or one corner of the rectangular light diffusing plate as a reference position, and print processing positions are usually determined based on spacing calculated using the reference position as a starting point. Also, positioning of the light diffusing plate during the attachment of the light diffusing plate to the rear frame is carried out using an inner peripheral face of a peripheral wall of the rear frame as a reference.

However, the light diffusing plate is made of a plastic sheet or plate. Since the plate or sheet is thus made of plastic, temperature changes and other such thermal effects will cause the light diffusing plate to exhibit relatively large expansion and contraction. Therefore, the expansion and the contraction due to the thermal effects are taken into account, and the light diffusing plate is produced in a size that is slightly smaller than the rectangle inner face of the peripheral wall of the rear frame, so as to prevent deformation of the light diffusing plate.

Consequently, relatively large gaps inevitably end up being formed in longitudinal and lateral directions between the light diffusing plate and the inner peripheral face of the peripheral wall of the rear frame. As a result, the light diffusing plate becomes misaligned in the longitudinal direction (the width direction of the optical processing regions) and the lateral direction. Furthermore, the linear light source and the optical processing regions of the light diffusing plate deviate from correct positions. Moreover, variance tends to occur in the brightness of the display face of the liquid crystal cell. This problem is also caused by the effect of the nominal deviation found in each part.

Meanwhile, with another conventional liquid crystal display device, light from an edge lamp type of light source is emitted from a plane using a light guide plate, and the light is passed through an optical sheet (see Japanese Laid-Open Patent Application Publication No. H11-84351, for example). The conventional liquid crystal display prevents strain deformation of the optical sheet or prevents an offset of the optical sheet by increasing the optical sheet placement accuracy in the liquid crystal display device. Furthermore, with another conventional liquid crystal display device, the brightness of a backlight becomes uneven if an optical sheet disposed in a small gap between a liquid crystal panel and a light guide plate is deformed in an undulating shape by thermal expansion. The conventional liquid crystal display device is conceived to prevent such brightness unevenness (see Japanese Laid-Open Patent Application Publication No. 2003-43484, for example). Moreover, another conventional liquid crystal display device is conceived to prevent the leakage of light from a backlight (see Japanese Laid-Open Patent Application Publication No. 2007-10818, for example).

The above-mentioned Japanese Laid-Open Patent Application Publication Nos. H11-84351 and 2003-43484 suggest ways to increase the accuracy with which an optical sheet is attached in a liquid crystal display device. However, there is no mention at all of a positional relationship between the linear light source and the optical processing regions of the light diffusing plate included in the optical sheet, nor is there any discussion suggesting the positional relationship between these two.

In view of the above, it will be apparent to those skilled in the art from this disclosure that there exists a need for an improved liquid crystal display device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal display device with which a linear light source and an optical processing region of a light diffusing plate can be aligned accurately.

In accordance with one aspect of the present invention, a liquid crystal display device includes a frame, a linear light source, a liquid crystal cell, a light diffusing plate and a positioning mechanism. The linear light source is attached to the frame at a specific position. The liquid crystal cell is attached to the frame. The light diffusing plate is disposed between the frame and the liquid crystal cell and has an optical processing region formed in a first direction from a first side portion of the light diffusing plate to a second side portion of the light diffusing plate. The positioning mechanism positions the light diffusing plate with respect to the frame with a middle portion of at least one of the first and second side portions of the light diffusing plate in a second direction perpendicular to the first direction being used as a reference to align the optical processing region of the light diffusing plate with the linear light source in the second direction.

With the liquid crystal display device of the present invention, it is possible to provide a liquid crystal display device with which a linear light source and an optical processing region of a light diffusing plate can be aligned accurately.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the selected embodiments of the present invention is provided for illustration only and not for the purpose of limiting the invention as defined by the appended claims and their equivalents.

Figure 1:
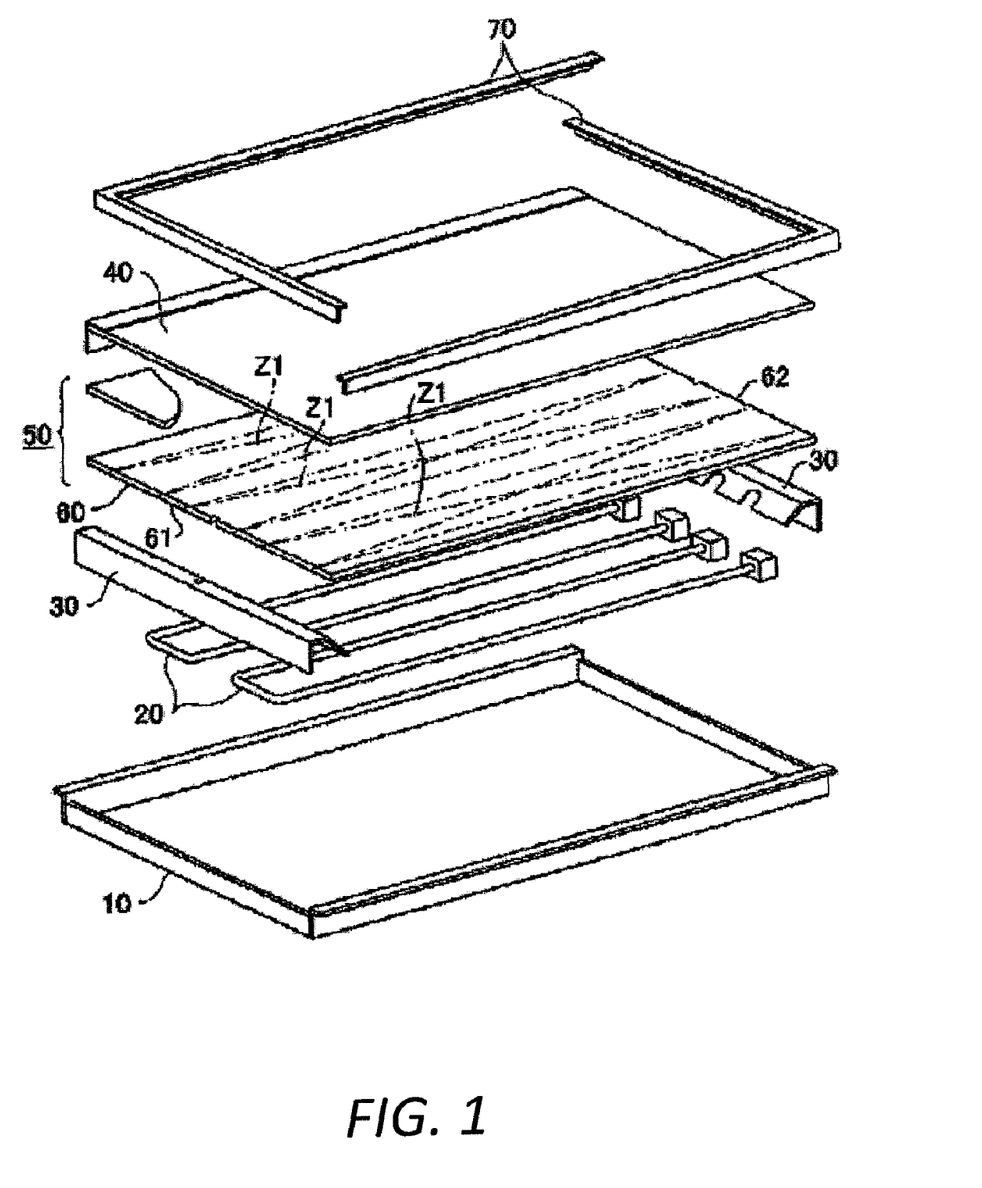
FIG. 1 is an exploded perspective view of the liquid crystal display device in accordance with the first embodiment of the present invention.
Figure 3:
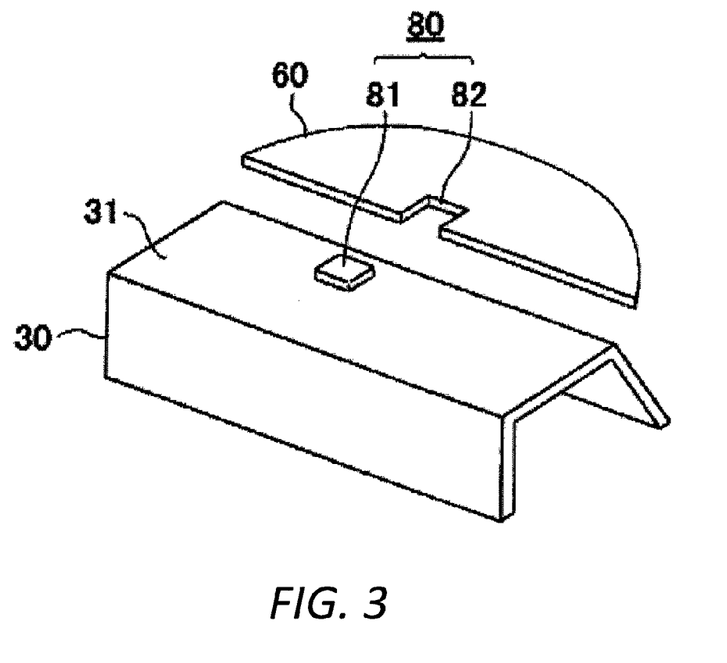
FIG. 3 is an exploded partial perspective view of the light diffusing plate and the lamp frame.

As shown in FIG. 1, a liquid crystal display device includes a rear frame 10, a linear light source 20, a pair of lamp frames 30, a liquid crystal cell 40, a plurality of optical sheets 50 and a bezel 70. The rear frame 10 is made of sheet metal. The rear frame 10 and the lamp frames 30 form a frame of the liquid crystal display device. The linear light source 20 and the lamp frame 30 are attached to the rear frame 10. The linear light source 20 includes a plurality of slender fluorescent tubes. As shown in FIG. 3, each of the lamp frames 30 includes a seat face 31 formed by a front face of each of the lamp frames 30. The lamp frames 30 are molded from plastic. The lamp frames 30 are disposed on left and right end portions of the rear frame 10. The lamp frames 30 cover and hide two ends of the linear light source 20. The liquid crystal cell 40 is also attached to the rear frame 10. A required number of optical sheets 50 are interposed between the rear frame 10 and the liquid crystal cell 40. The light diffusing plate 60 is generally included in the optical sheets 50. The light diffusing plate 60 is made from a plastic plate or sheet. The liquid crystal cell 40 and the optical sheets 50 are fixed to the rear frame 10 by the bezel 70.

The light diffusing plate 60 diffuses light emitted from the linear light source 20 by passing the light through the light diffusing plate 60. The light diffusing plate 60 serves to make the brightness more uniform on a display face of the liquid crystal cell 40. A plurality of (three) optical processing regions Z1 in the form of a plurality of bands are formed by printed regions printed on just one side of the light diffusing plate 60. The optical processing regions Z1 extend in a transverse direction (e.g., first direction) of the light diffusing plate 60 from one end (e.g., a first side portion) 61 to the other end (e.g., a second side portion) 62 of the light diffusing plate 60. Each of the optical processing regions Z1 has a light diffusion ratio varied in a width direction (e.g., second direction or longitudinal direction) Y of the optical processing regions Z1. The width direction is perpendicular to the transverse direction of the light diffusing plate 60.

Figure 2A:
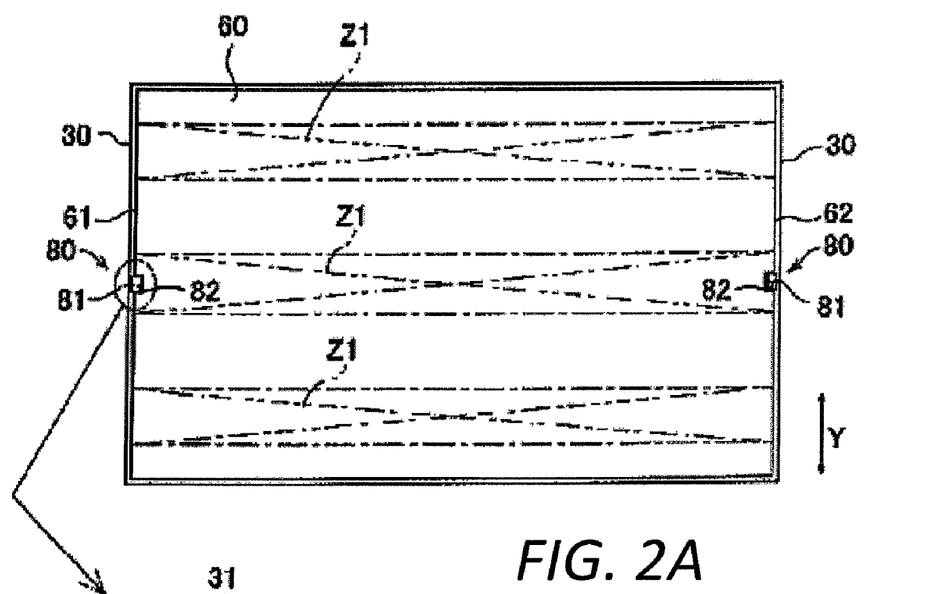
FIG. 2A is a front elevational view of a light diffusing plate and a lamp frame of the liquid crystal display device illustrated in FIG. 1.
Figure 2B:
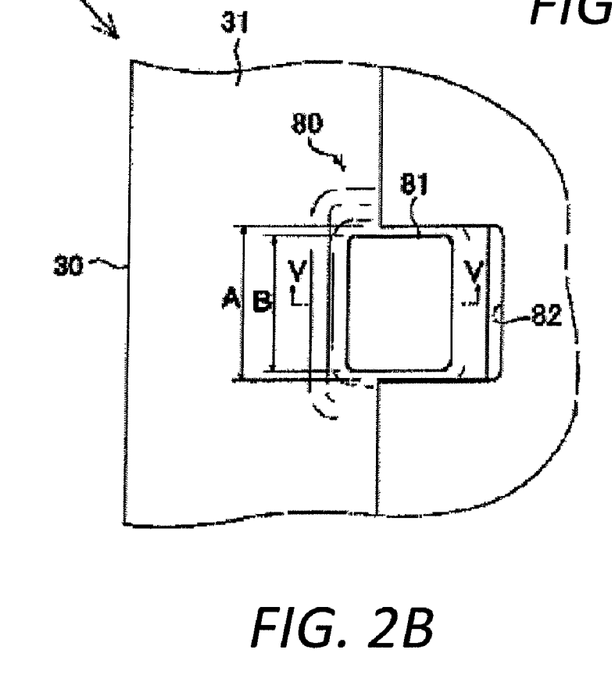
FIG. 2B is a partial front elevational view of a positioning mechanism of the liquid crystal display device illustrated in FIG. 1.

As shown in FIGS. 2 and 3, the liquid crystal display device further has a pair of positioning mechanisms 80 disposed between the lamp frames 30 and the light diffusing plate 60 on left and right sides of the liquid crystal display device. The positioning mechanisms 80 position the light diffusing plate 60 superposed over the rear frame 10 with respect to the rear frame 10. Specifically, the positioning mechanisms 80 align the optical processing regions Z1 of the light diffusing plate 60 with the linear light source 20 in the width direction Y.

Each of the positioning mechanisms 80 includes a convex engaging component 81 and an engaged component 82. The convex engaging component 81 is a convex portion provided to each of the lamp frames 30. The engaged components 82 are recess portions provided to the one end 61 and the other end 62 of the light diffusing plate 60 to mate with the engaging components 81.

Each of the engaging components 81 is provided to a middle part (e.g., middle portion) in a longitudinal direction (coincides with the width direction Y of the optical processing regions Z1) of the seat face 31 of each of the lamp frames 30. The middle part extends in the longitudinal direction. The engaged components 82 include recess holes formed as depressions in a middle part (e.g., middle portion) of each of the one end 61 and the other end 62 of the light diffusing plate 60. The middle part extends in the longitudinal direction. As shown in FIG. 2B, the convex engaging components 81 are substantially rectangular in a front elevational view. The engaged components 82 are recessed substantially in a U shape. A longitudinal width A of each of the engaged components 82 is equal to or somewhat greater than a longitudinal width B of respective one of the engaging components 81. When the engaged components 82 are mated with the engaging components 81, the engaged components 82 are engaged with the engaging components 81 in the width direction Y of the optical processing regions Z1. Thus, the optical processing regions Z1 are aligned with the linear light source 20 in the width direction Y. The longitudinal width A of the engaged components 82 and the longitudinal width B of the engaging components 81 is extremely small in relation to the longitudinal width of the light diffusing plate 60. Therefore, the engaged components 82 are not affected by the thermal expansion and contraction caused by the thermal effect of the light diffusing plate 60.

The light diffusing plate 60 is superposed over the seat faces 31 of the lamp frames 30 on the rear frame 10, and is positioned with respect to the rear frame 10. With this configuration, an attachment reference position of the light diffusing plate 60 with respect to the rear frame 10 corresponds to a place where the engaging components 81 is provided on the rear frame 10. Therefore, there is far less deviation in the attachment position of the light diffusing plate 60 with respect to the rear frame 10 caused by thermal expansion and contraction due to thermal effects of the light diffusing plate 60. Thus, the light diffusing plate 60 is positioned more accurately than in the past. Also, the engaged components 82 are provided to the one end 61 and the other end 62 of the light diffusing plate 60, and the engaging components 81 are provided to the rear frame 10. In other words, the light diffusing plate 60 having the engaged components 82 is integrally formed as a one-piece unitary member, and each of the lamp frames 30 having the engaging components 81 is integrally formed as a one-piece unitary member. Thus, there is no need for the engaging components 81 or the engaged components 82 to be added as a separate part. Furthermore, since there is no increase in the number of required parts, there is no decrease in productivity or suitability to mass production.

Furthermore, the engaged components 82 are not affected by the thermal expansion and contraction caused by the thermal effect of the light diffusing plate 60. Thus, even if the size of the light diffusing plate 60 is slightly smaller than a rectangle inner peripheral face of a peripheral wall of the rear frame 10, the light diffusing plate 60 will not be loose with respect to the rear frame 10. Moreover, even if the light diffusing plate 60 is loose, the looseness width can be kept to a minimum. Also, when the positioning mechanisms 80 are thus used to position the light diffusing plate 60 accurately with respect to the rear frame 10, the optical processing regions Z1 of the light diffusing plate 60 will naturally be accurately aligned with the linear light source 20 attached to the rear frame 10. Furthermore, since the optical processing regions Z1 of the light diffusing plate 60 are more accurately aligned with the linear light source 20 attached to the rear frame 10, the performance of the light diffusing plate 60 is improved. Therefore, for the single liquid crystal cell 40, variance in the brightness of the display face is suppressed. Furthermore, variance is also less likely to occur in the brightness of the display faces of liquid crystal cells between different liquid crystal display devices with the same structure. As a result, the user is able to enjoy a more stable image with the liquid crystal display device.

The engaged components 82 are provided at the middle part of the light diffusing plate 60 in the longitudinal direction, and engaged with the engaging components 81 provided to the middle part of the lamp frames 30 in the longitudinal direction. In other words, the middle part of the light diffusing plate 60 is used as a reference for positioning. Thus, even if the light diffusing plate 60 expands or contracts due to thermal effects of the light diffusing plate 60, the maximum positional deviation amount of the light diffusing plate 60 in the longitudinal direction can be more suppressed than in the past when the light diffusing plate 60 is positioned using the inner peripheral wall of the rear frame as a reference.

Figure 4:
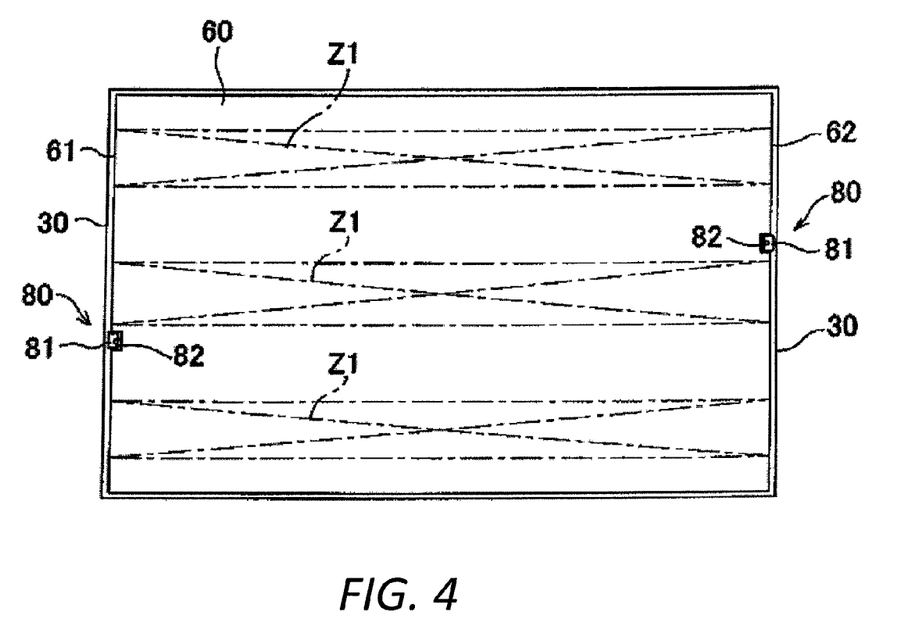
FIG. 4 is a front elevational view of a light diffusing plate and a lamp frame of a liquid crystal display device in accordance with a modification of the present invention.

In this embodiment, a case was described in which the middle part of the light diffusing plate 60 in the longitudinal direction and the middle part of the lamp frames 30 attached to the rear frame 10 in the longitudinal direction are positioned by the positioning mechanisms 80. However, as shown in FIG. 4, the place where the engaged component 82 formed at the one end 61 of the light diffusing plate 60 and the place where the engaged component 82 are formed at the other end 62 of the light diffusing plate 60 can be shifted in a direction in which the optical processing regions Z1 are lined up on the light diffusing plate 60. In other words, the engaged component 82 formed at the one end 61 and the engaged component 82 formed at the other end 62 can be disposed at different positions in the longitudinal direction of the light diffusing plate 60. In this case, the positions of the engaging components 81 provided to the lamp frames 30 are shifted in the same direction. When this is done, even if the optical processing regions Z1 are formed by printing regions made on only one side of the light diffusing plate 60, an advantage is that the light diffusing plate 60 can be put right-side-up merely by mating the engaged components 82 with the engaging components 81. In other words, the light diffusing plate 60 naturally does not end up being attached upside-down, which would diminish the optical performance of the liquid crystal display device.

In this embodiment, a case was described in which the light diffusing plate 60 includes the engaged components 82, and the lamp frames 30 include the engaging components 81. However, the light diffusing plate 60 can include convex engaging components, and the lamp frames 30 can be recessed to form engaged components.

Figure 5:
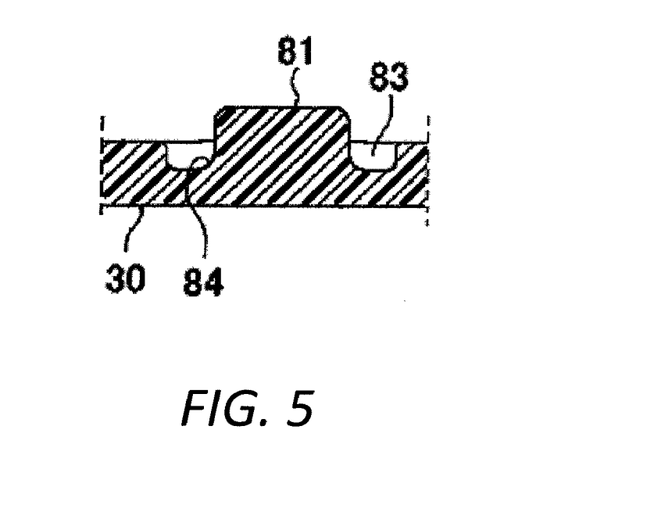
FIG. 5 is a partial cross sectional view taken along V-V line in FIG. 2.

As shown in FIG. 5, each of the positioning mechanisms 80 further includes a depression 83 and a curved face 84. The depression 83 is formed recessed around a base of each of the convex engaging components 81. The curved faces 84 are provided at the bases of the engaging components 81. With the depression 83 and the curved face 84, the engaging components 81 are prevented from being damaged at the bases.

Figure 6:
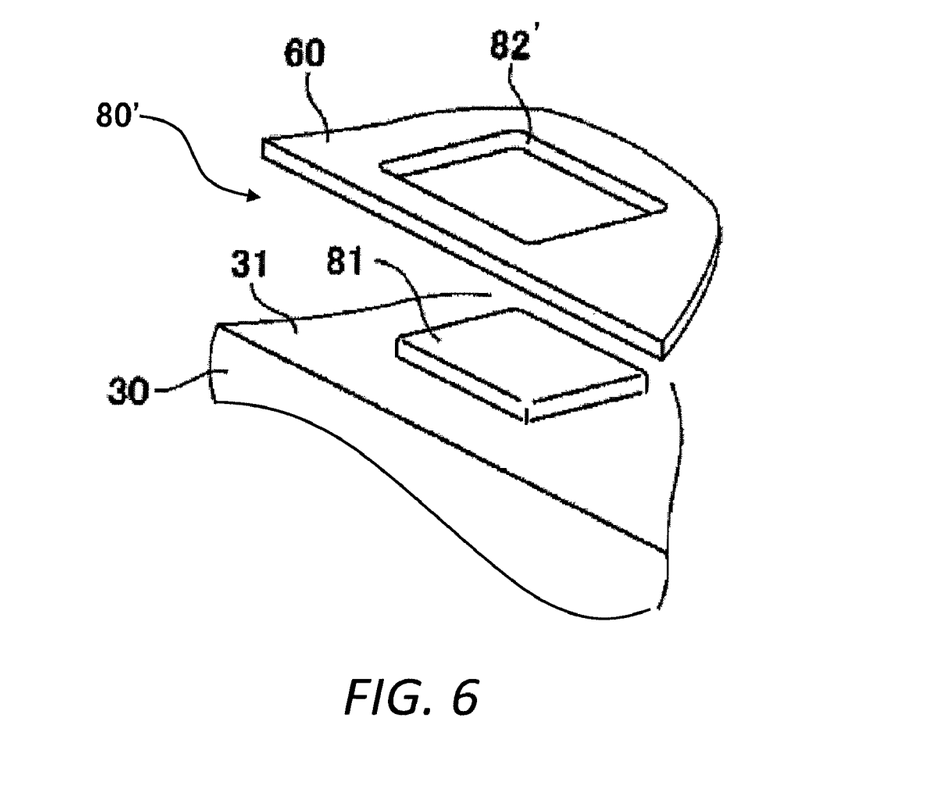
FIG. 6 is an exploded partial perspective view of a positioning mechanism of a liquid crystal display device in accordance with a second embodiment of the present invention.

FIG. 6 is an exploded partial perspective view of a positioning mechanism 80' of a liquid crystal display device in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

An engaged components 82' are substantially rectangular through-holes formed as depressions in the middle part of each of the one end 61 and the other end 62 of the light diffusing plate 60. More specifically, each of the rectangular through-holes of the engaged components 82' has a continuous periphery. The engaged components 82' are mated with the convex engaging components 81. The positioning mechanisms 80' have the same positioning and alignment actions as above.

Figure 7:
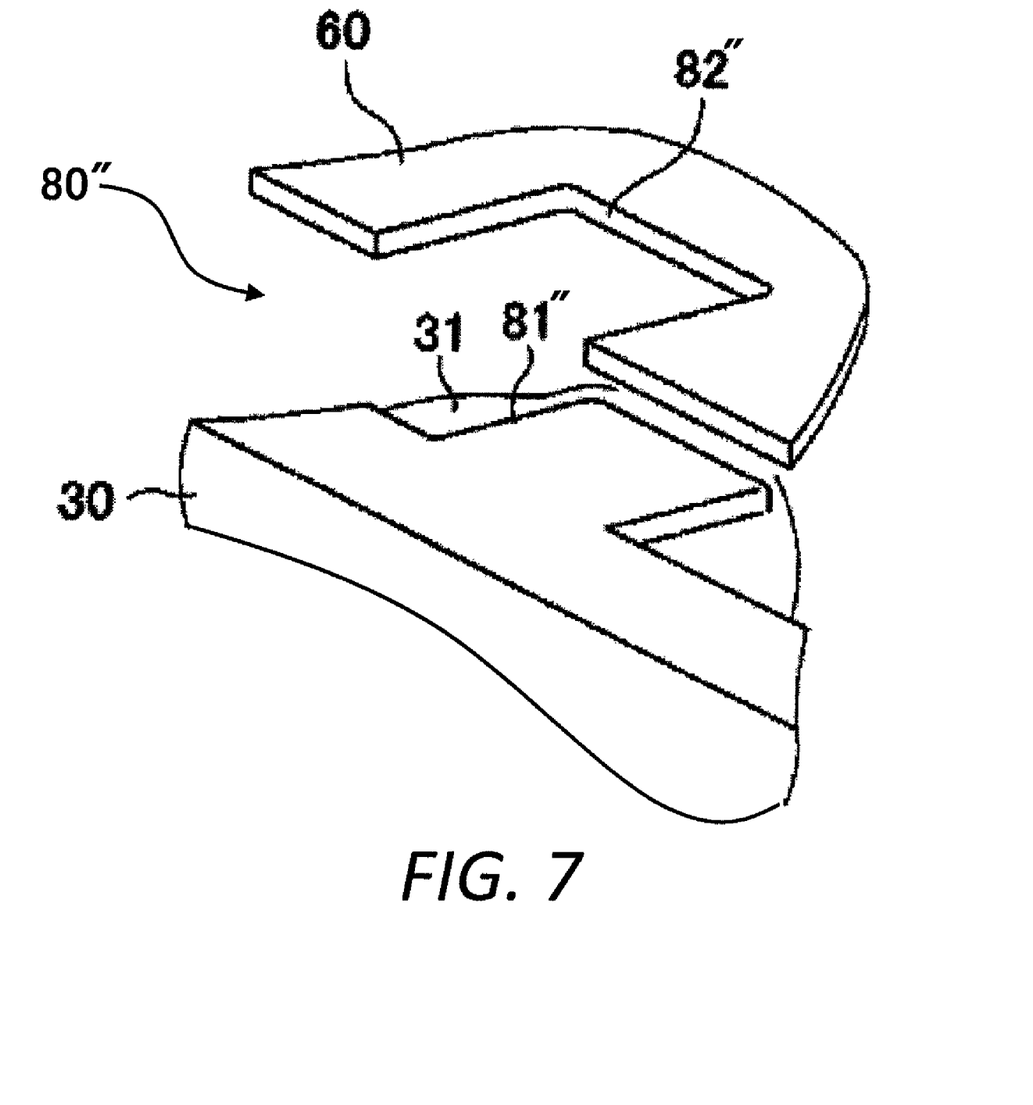
FIG. 7 is an exploded partial perspective view of a positioning mechanism of a liquid crystal display device in accordance with a third embodiment of the present invention.

FIG. 7 is an exploded partial perspective view of a positioning mechanism 80" of a liquid crystal display device in accordance with a third embodiment of the present invention. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The engaging components 81" have stepped faces raised from the seat faces 31 of the lamp frames 30. Specifically, each of the engaging components 81" has a rectangular shape. Each of the engaging components 81" is integrally formed with a flange portion that is formed on an outer edge portion of each of the seat faces 31 and is raised from the seat faces 31. Each of engaged components 82" includes a recess open to the transverse directions of the light diffusing plate 60. The engaged components 82" are mated with the engaging components 81. The positioning mechanisms 80" have the same positioning and alignment actions as above.

In the above embodiments, the place where the engaged components 82, 82' or 82" are formed at the one end 61 and the other end 62 of the light diffusing plate 60 is designated as a reference position. The print processing positions for forming the optical processing regions Z1 on one side of the light diffusing plate 60 are determined based on spacing calculated using the reference position as a starting point. Therefore, the accuracy of the above-mentioned positioning and alignment actions is increased even more. Specifically, the positional accuracy is increased between the linear light source 20 and the optical processing regions Z1 of the light diffusing plate 60 attached to the rear frame 10.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal display device equipped with the present invention. Accordingly, these terms, as utilized to describe the present invention should be interpreted relative to a liquid crystal display device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A liquid crystal display device comprising:
a frame;
a linear light source attached to the frame at a specific position;
a liquid crystal cell attached to the frame;
a light diffusing plate disposed between the frame and the liquid crystal cell, and having an optical processing region formed in a first direction from a first side portion of the light diffusing plate to a second side portion of the light diffusing plate, the optical processing region being printed on only one side of the light diffusing plate; and
a positioning mechanism positioning the light diffusing plate with respect to the frame with a middle portion of at least one of the first and second side portions of the light diffusing plate in a second direction perpendicular to the first direction being used as a reference to align the optical processing region of the light diffusing plate with the linear light source in the second direction.

2. The liquid crystal display device according to claim 1, wherein
the positioning mechanism includes a plurality of engaging components formed on one of the frame and the light diffusing plate, and a plurality of engaged components formed on the other of the frame and the light diffusing plate and mating with the engaging components, respectively.

3. The liquid crystal display device according to claim 2, wherein
the engaging components are provided on the frame, and
the engaged components are provided to the first and second side portions of the light diffusing plate, respectively, and engaged with the engaging components in the second direction to align the optical processing region of the light diffusing plate with respect to the linear light source in the second direction.

4. The liquid crystal display device according to claim 3, wherein
the frame includes a rear frame to which the linear light source is attached, and a pair of lamp frames attached to the rear frame so as to cover an end of the linear light source,
each of the engaging components includes a convex portion formed on each of the lamp frames, and
each of the engaged components includes a recess portion formed in the middle portion of each of the first and second side portions of the light diffusing plate.

5. The liquid crystal display device according to claim 3, wherein
the frame includes a rear frame to which the linear light source is attached, and a pair of lamp frames attached to the rear frame so as to cover an end of the linear light source,
each of the engaging components includes a convex portion formed on each of the lamp frames, and
each of the engaged components includes a through-hole formed in the middle portion of each of the first and second side portions of the light diffusing plate.

6. A liquid crystal display device comprising:
a frame;
a linear light source attached to the frame at a specific position;
a liquid crystal cell attached to the frame;
a light diffusing plate disposed between the frame and the liquid crystal cell, and having an optical processing region formed in a first direction from a first side portion of the light diffusing plate to a second side portion of the light diffusing plate, the optical processing region being printed on only one side of the light diffusing plate; and
a positioning mechanism positioning the light diffusing plate with respect to the frame with a middle portion of at least one of the first and second side portions of the light diffusing plate in a second direction perpendicular to the first direction being used as a reference to align the optical processing region of the light diffusing plate with the linear light source in the second direction, the positioning mechanism including a plurality of engaging components that is formed on the frame, and a plurality of engaged components that is formed on the light diffusing plate with the engaged components mating with the engaging components, respectively, one of the engaged components formed at the first side portion of the light diffusing plate and the other of the engaged components formed at the second side portion of the light diffusing plate being disposed at different positions in the second direction.

7. The liquid crystal display device according to claim 6, wherein the frame includes a rear frame to which the linear light source is attached, and a pair of lamp frames attached to the rear frame so as to cover an end of the linear light source, each of the engaging components includes a convex portion formed on each of the lamp frames, and each of the engaged components includes a recess portion formed in the middle portion of each of the first and second side portions of the light diffusing plate.

8. The liquid crystal display device according to claim 6, wherein the frame includes a rear frame to which the linear light source is attached, and a pair of lamp frames attached to the rear frame so as to cover an end of the linear light source, each of the engaging components includes a convex portion formed on each of the lamp frames, and each of the engaged components includes a through-hole formed in the middle portion of each of the first and second side portions of the light diffusing plate.

* * * * *